United States Patent [19]

Saylor

[11] Patent Number: 5,516,318

[45] Date of Patent: May 14, 1996

[54] PAD FOR CONTAINING LIQUID SPILLS

[76] Inventor: Steven Saylor, Evergreen Studio, Box 204, Dayton, Nev. 89403

[21] Appl. No.: 349,207

[22] Filed: Dec. 5, 1994

[51] Int. Cl.[6] .................................................. F16K 23/00
[52] U.S. Cl. ..................... 441/40; 137/312; 114/74 R; 441/41
[58] Field of Search ................... 114/74 R, 74 T; 441/40, 41; 4/588, 506; 137/312; 220/573; 294/19.1

[56] References Cited

U.S. PATENT DOCUMENTS

| | | | |
|---|---|---|---|
| 2,220,069 | 11/1940 | Farwig | 294/19.1 |
| 2,689,812 | 9/1954 | Mollica et al. | 4/506 |
| 2,714,726 | 8/1955 | Hasselquist | 4/506 |
| 3,058,122 | 10/1962 | Mcdaniel et al. | 4/588 |
| 4,838,967 | 6/1989 | Todd et al. | 4/588 |
| 5,052,319 | 10/1991 | Beyrouty | 114/74 T |
| 5,099,872 | 3/1992 | Tarvin et al. | 220/573 |

*Primary Examiner*—Sherman Basinger
*Attorney, Agent, or Firm*—Armstrong, Westerman, Hattori, McLeland & Naughton

[57] ABSTRACT

A pad, system and method of collecting and containing liquid leaks and spills, comprising a flexible, liquid-impervious pad having a bottom and inflatable sides, a pair of tethers connected at one end to one end of the pad, and a pair of poles detachably connectable at one end thereof to the tethers. The poles are used to position the uninflated pad under a source of leakage or spillage, after which the poles are disconnected from the tethers and the sides of the pad are inflated.

6 Claims, 2 Drawing Sheets

PAD FOR CONTAINING LIQUID SPILLS

BACKGROUND OF THE INVENTION

1. Field of the Invention

This invention relates to a flexible, liquid impervious pad having inflatable sides for positioning under a vehicle or other source of liquid spills in order to contain the spill.

2. Description of Prior Art

U.S. Pat. No. 5,308,670 discloses a pad for containing liquid or semiliquid spills wherein the pad has hollow side portions which are expanded in use by insertion therein of a hose. That construction is limited in not being able to contain large volume liquid spills as might occur, for example, from a tank truck or other large liquid containers.

SUMMARY OF THE INVENTION

This invention overcomes the deficiencies of the prior art by providing a pad having sides which can be inflated with air to form a container having a relatively great depth, hence capable of containing large liquid spills. The uninflated pad is positioned under a leaking or spilling container with use of a pair of poles detachably connected at one end to one end of the pad.

DESCRIPTION OF PREFERRED EMBODIMENTS

Figure 1:
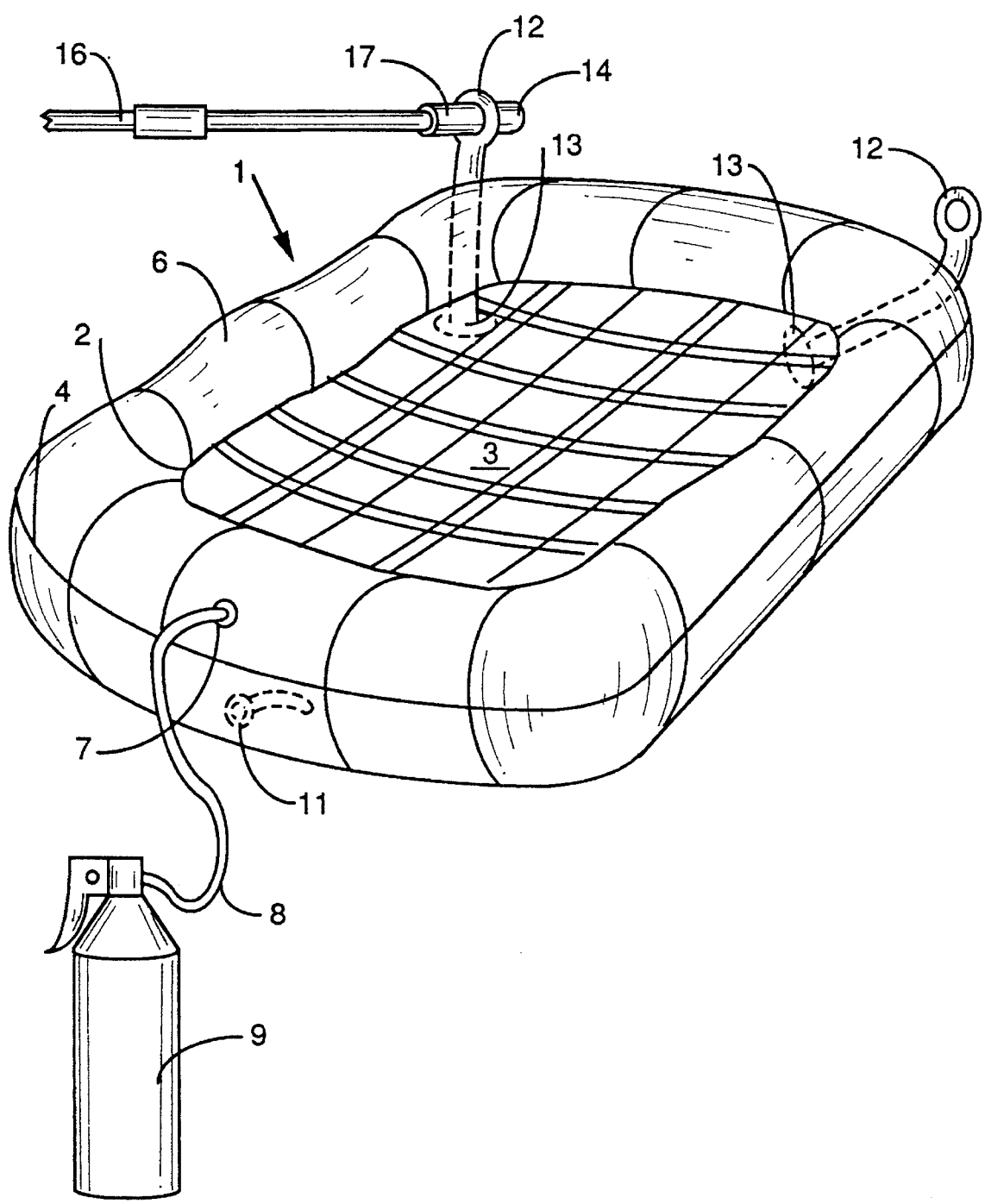
FIG. 1 is a perspective view of the pad of the invention, and showing the method and means for inflating the sides of the pad.
Figure 2:
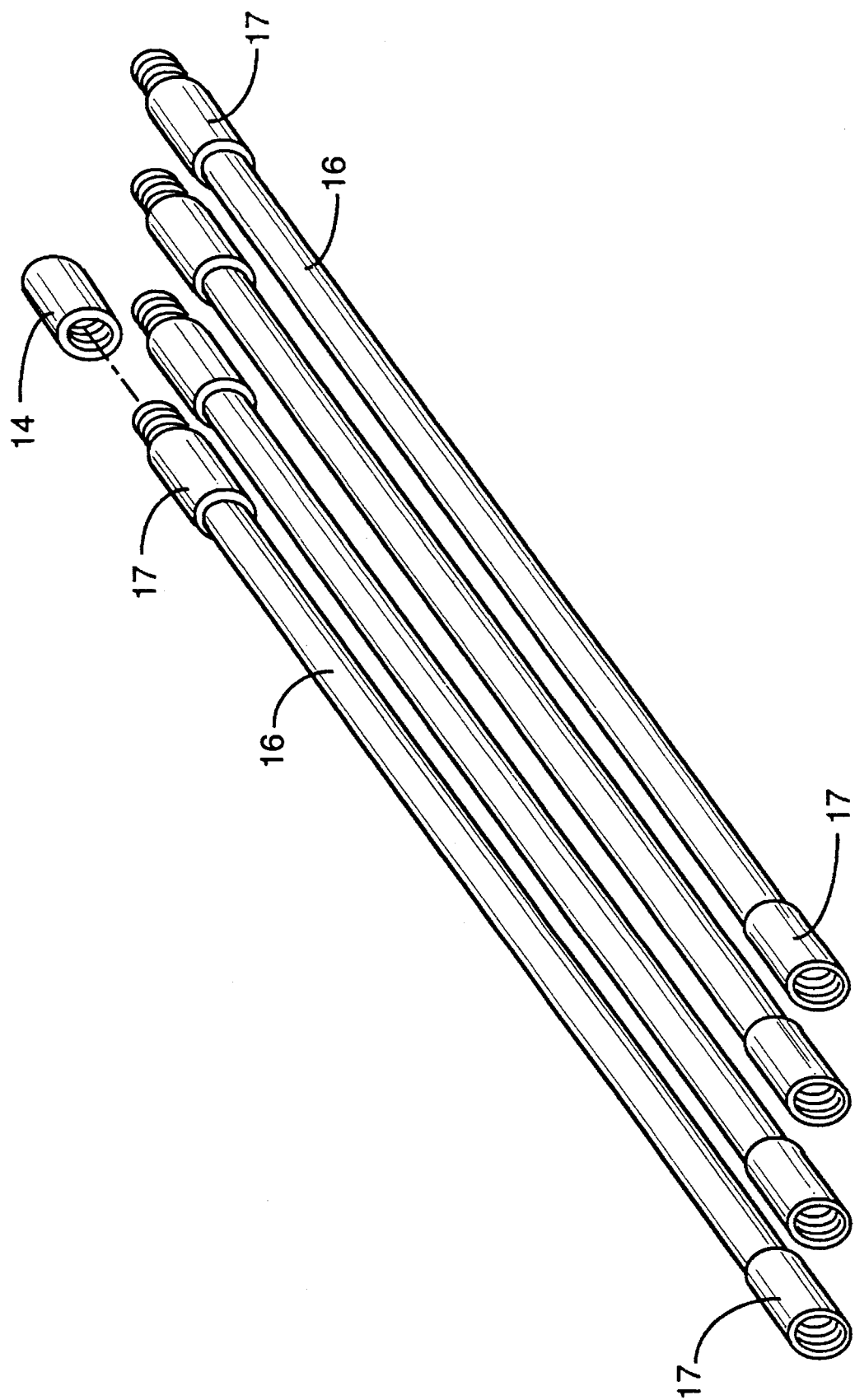
FIG. 2 is a perspective view of a set of poles used to position the pad under a truck or other source of liquid spillage.

In FIG. 1 there is shown a container pad, denoted generally by the numeral 1, comprising two sheets of polyvinyl chloride, such as 20 mil PVC sheeting, welded together on the inside, as at 2, to form a bottom 3, and on the outside, as at 4, to form inflatable sides 6. The pad 1 is provided with an air valve 7, of known type, to inflate sides 6, e.g. through an air hose 8 connected at the other end to a compressed air cannister 9. A pressure relief valve 11, of known type, communicates with the interior of the sides 6 to prevent over-inflation and rupture thereof. Tethers 12 are welded at one end, as at 13, to the bottom 3. Tethers 12 may be connected, as by caps 14, to one end of each of a pair of poles 16 which can be used to position the pad 1 under the source of a liquid leakage or spillage. Poles 16 may be provided in segments of, e.g. about 3 feet in length. Multiple segments may be joined together, by connectors 17. As shown in FIG. 2, normally four poles, connectable to form two six foot lengths, are sufficient for most purposes, e.g. positioning a collection pad under a leaking truck tank.

In operation, poles 16 are connected to tethers 12 and an uninflated pad is pushed into position under the source of leakage. The poles then may be disconnected from tethers 12, and the sides 6 of the pad 1 are inflated with compressed air.

Pads may be constructed of any desired size, for example, from a volume of 50 to 2500 gallons. Multiple pads may be used for largest spillages.

The spill collection system of the invention is useful in catching and containing leaks and spillages of hazardous materials such as hydrocarbon fuels, industrial chemicals and the like. The pads provide a capability, not only of containing such materials so that the environment is not polluted, but such materials may be recovered and used for their intended purpose.

A convenient approach to use of the invention is to put one or more pads, in uninflated and rolled up state, aboard a vehicle transporting fuels, chemicals, etc., so that, in case of accidental leaks or spills, the pads can be used immediately thereby lessening the adverse effects of the spill.

The collection pads of the invention are easily and simply made of relatively inexpensive materials and may be thrown away after use. Poles 16, e.g. of PVC, and the compressed air cylinder 9 may be reused.

What is claimed is:

1. A system adapted for carrying on-board a land-based vehicle for emergency use in collecting liquid leakage and spills, comprising a foldable, flexible, liquid-impermeable pad having a bottom and inflatable sides, a pair of tethers welded to the bottom of the pad at one end thereof, each tether having an aperture in a free end thereof, a plurality of pole segments, a plurality of connectors by means of which at least a pair of pole segments are connectable together to form a pad positioning pole having one end thereof adapted to fit in the aperture of a tether whereby a pair of poles serves to position an unfolded and uninflated pad under a source of liquid leakage or spill from the vehicle.

2. A system according to claim 1, further comprising an air valve through which air from an on-board compressed air storage container can be admitted to the interior of the inflatable sides of the positioned pad to inflate the sides so as to contain the leakage or spill in the pad.

3. A system according to claim 1, further comprising a pair of caps for securing the ends of the positioning poles to the tethers.

4. A method of quickly and effectively collecting and containing liquid leakage and spills from a land-based vehicle, comprising carrying on-board the vehicle a folded, flexible, liquid-impermeable pad having a bottom, inflatable sides and a pair of tethers, one end of each tether being welded to the bottom of the pad at one end thereof and having a aperture in the other end of the tether, and a pair of pad-positioning poles wherein each pole has one end thereof adapted to fit in the aperture of a tether, on the occurrence of a liquid leakage or spill from the vehicle, unfolding the pad, attaching the one end of each pole to a tether by means of the aperture therein, with use of the positioning poles, positioning the uninflated pad under a source of liquid leakage or spill, inflating the sides of the pads, and collecting the liquid leakage or spill in the inflated pad.

5. A method according to claim 4, wherein the sides of the pad are inflated through a valve in the sides of the pad by means of compressed air from a source on-board the vehicle.

6. A method according to claim 4, wherein the positioning poles are collapsible for storage and extendable for use and, after the pad is positioned under the source of liquid leakage or spill, the extended positioning poles are disconnected from the tethers, collapsed and retained for storage and future use.

\* \* \* \* \*